(12) United States Patent
Kondou

(10) Patent No.: US 8,058,623 B2
(45) Date of Patent: Nov. 15, 2011

(54) DETECTION SIGNAL PROCESSOR

(75) Inventor: Kiyoshi Kondou, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 493 days.

(21) Appl. No.: 12/393,040

(22) Filed: Feb. 26, 2009

(65) Prior Publication Data

US 2009/0218501 A1 Sep. 3, 2009

(30) Foreign Application Priority Data

Feb. 29, 2008 (JP) ................................. 2008-051337

(51) Int. Cl.
*G01T 1/24* (2006.01)
(52) U.S. Cl. ................................................. 250/370.09
(58) Field of Classification Search ............. 250/370.08, 250/370.09, 370.14; 327/530; 345/501; 378/98.8
See application file for complete search history.

(56) References Cited

U.S. PATENT DOCUMENTS

| | | | | |
|---|---|---|---|---|
| 5,880,470 | A * | 3/1999 | Umetani et al. | 250/370.09 |
| 2002/0100921 | A1 | 8/2002 | Mabuchi | |
| 2003/0016298 | A1 | 1/2003 | Rossi | |
| 2004/0065840 | A1 | 4/2004 | Morishita | |
| 2006/0065813 | A1 | 3/2006 | Yamaguchi | |
| 2007/0080299 | A1 * | 4/2007 | Endo et al. | 250/370.09 |

FOREIGN PATENT DOCUMENTS

| | | |
|---|---|---|
| EP | 0899871 A | 3/1999 |
| EP | 1848198 A | 10/2007 |
| JP | 2002-209149 | 7/2002 |

OTHER PUBLICATIONS

Corresponding Extended European Search Report.

* cited by examiner

*Primary Examiner* — David Porta
*Assistant Examiner* — Marcus Taningco
(74) *Attorney, Agent, or Firm* — SOLARIS Intellectual Property Group, PLLC

(57) ABSTRACT

A detection signal processor that includes a signal processing unit, bias current supply components, and a bias current control component is provided. The signal processing unit applies a first signal processing in parallel to plural detection signals input in parallel, converts the plural detection signals to serial detection signals by applying a parallel-to-serial conversion processing to the plural detection signals, and applies a second signal processing to the converted serial detection signals in turn. The bias current control component switches amount of the bias currents supplied to the each circuit configuring the signal processing unit by the bias current supply components, the bias currents including first bias currents supplied to the first circuits carrying out the first signal processing and second bias currents supplied to the second circuits carrying out the parallel-to-serial conversion processing and the second signal processing in turn.

10 Claims, 7 Drawing Sheets

DETECTION SIGNAL PROCESSOR

CROSS-REFERENCE TO RELATED APPLICATION

This application claims priority under 35 USC 119 from Japanese Patent Application No. 2008-051337, the disclosure of which is incorporated by reference herein.

BACKGROUND OF THE INVENTION

1. Field of the Invention

The present invention relates to a detection signal processor and, more particularly, to a detection signal processor for performing signal processing including parallel to serial conversion of plural detection signals input in parallel.

2. Description of the Related Art

In a known radiography system for medical diagnoses, radiations transmitted through an object are made to hit a radiation detector equipped with a photoelectric conversion layer that is sensitive to the radiations. Electric charges are accumulated in the radiation detector in response to the radiation dose to the detector. The electric charges are successively read out as an electric current for each unit region of readout. The current read out is converted into digital data. Thus, a digital radiation image is obtained. A radiation detection panel is also known as such a radiation detector. The radiation detection panel has a glass substrate on which a large number of TFTs (thin-film transistors) and signal lines are formed to provide a TFT active matrix substrate, the TFTs being arranged like a matrix. A photoelectric conversion layer is formed on this substrate.

A signal processing unit is connected with the radiation detector. An integrator circuit for integrating a signal charge outputted as an electric current from the radiation detector for a given period, a first amplifier circuit for amplifying the output signal from the integrator circuit, a parallel to serial converter for converting the parallel signal outputted from the first amplifier circuit into serial form, a second amplifier circuit for amplifying the output signal from the parallel to serial converter, and an A/D converter for converting the output signal from the second amplifier circuit into digital data are connected in turn to constitute the signal processing unit.

Regarding readout of electric charges from a MOS solid-state image pick-up device in which image information is stored as electric charges in the same way as in a radiation detection panel, a technique for achieving power consumption reduction and random noise reduction is disclosed in JP-A No. 2002-209149. In particular, the system is composed of an output amplifier or AGC circuit and an A/D converter, as well as an output unit. A signal that was outputted from the sensor unit of the MOS solid-state image pick-up device and has undergone offset correction in a CDS/signal holding circuit and a parallel to serial conversion is applied to the output unit. The amount of a bias current supplied to the output unit is varied with the frequency of the driving signal according to a driving mode signal.

As mentioned previously, in the technique described in JP-A No. 2002-209149, the amount of the bias current supplied to the output unit to which the signal undergoing a parallel to serial conversion is applied is varied with the frequency of the driving signal according to the driving mode signal. The signal processing unit connected with the radiation detector or the like is made up of a larger number of circuits. The system is so configured that bias currents are supplied to the circuits to operate them. Therefore, where the technique described in JP-A No. 2002-209149 is applied to the signal processing unit connected with the radiation detector or the like, it is conceivable to switch the bias currents supplied to the circuits disposed on the upstream side of the circuits for processing the signal undergone a parallel to serial conversion in an attempt to reduce noise, as well as the bias currents supplied to the circuits for processing the signal undergone the parallel to serial conversion.

In this configuration, however, when high-speed operation is required, relatively large bias currents are supplied to all the circuits of the signal processing unit. The signal processing unit connected with the radiation detector is often accommodated within the same enclosure together with the radiation detector. Meanwhile, the radiation detector may have low heatproofness. Therefore, if relatively large bias currents are supplied to all the circuits of the signal processing unit, the amounts of heat generated by the circuits of the signal processing unit increase. Consequently, the inside of the enclosure gets hot. This creates the danger that the radiation detector is damaged. Furthermore, there is a possibility that characteristic variations such as offset take place as the temperature is increased. Especially, X-ray detectors used in medical applications are required to have high reliability and high stability.

Furthermore, in the above-described configuration, in a case where low-speed operation is tolerated, relatively small bias currents are supplied to all the circuits of the signal processing unit. In this case, the amounts of heat generated by the circuits of the signal processing unit decrease, resulting in decrease in thermal noise. However, this is overcome by the effects of noise components superimposed in a signal transmission path because of decrease in the gain of the amplifier circuit. Eventually, there arises the problem that the S/N deteriorates. Low-speed operation is allowed in the signal processing unit of the radiation detector in a case where a high-definition image is outputted. Where a high-definition image is outputted, it is undesirable that the S/N of the detection signal deteriorates.

SUMMARY OF THE INVENTION

The present invention has been made taking account of the foregoing facts. It is an object of the invention to provide a detection signal processor that can be operated with high-speed outputting while suppressing the amount of generated heat or operated with low noise.

One aspect of the invention provides a detection signal processor having a signal processing unit, bias current supply components for supplying bias currents to circuits forming the signal processing unit, and a bias current control component for switching the amount of each individual one of bias currents supplied to the circuits forming the signal processing unit by the bias current supply components. The circuits include first circuits and second circuits. The signal processing unit performs first signal processing in parallel on plural detection signals input in parallel. The signal processing unit then performs processing for parallel to serial conversion on the detection signals undergone the first signal processing to convert the detection signals into serial detection signals. The signal processing unit then performs second signal processing on the serial detection signals obtained by the conversion. The bias currents include first bias currents supplied to the first circuits performing the first signal processing and second bias currents supplied to the second circuits performing the processing for the parallel to serial conversion and the second signal processing in turn.

DETAILED DESCRIPTION OF THE INVENTION

Figure 1:
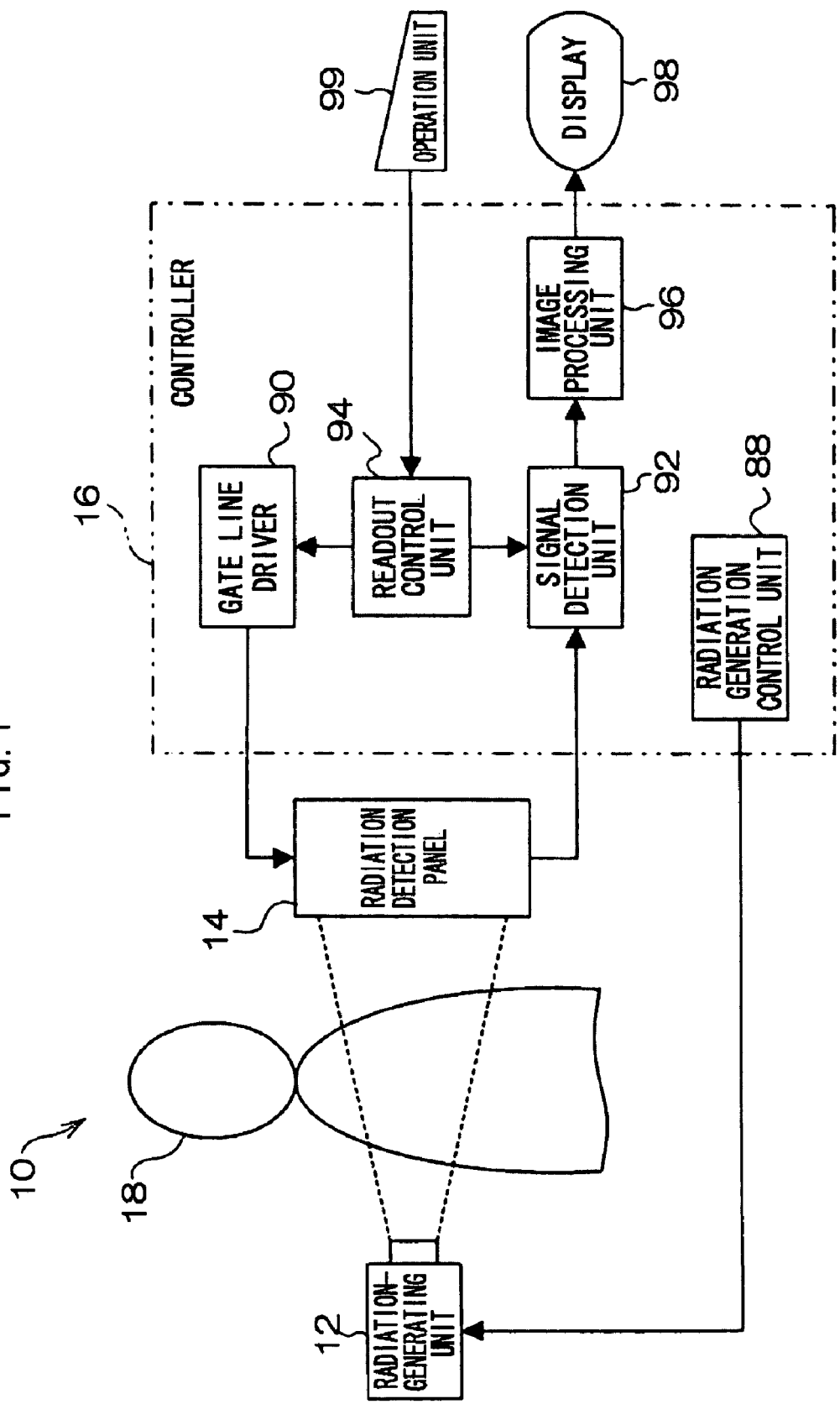
FIG. 1 is a schematic diagram of a radiation image pick-up system associated with one embodiment of the present invention.

One embodiment of the present invention is hereinafter described in detail with reference to the drawings. Referring to FIG. 1, there is shown a radiation image pick-up system 10 associated with the embodiment. The radiation image pick-up system 10 has a radiation-generating unit 12 for generating radiation such as X-rays, a radiation detection panel 14 spaced from the radiation-generating unit 12, and a controller 16 including a microcomputer and various electrical circuits. The controller 16 acquires image information from the radiation detection panel 14 and performs various kinds of processing. A pick-up position at which an object 18 is placed during pick-up is located between the radiation-generating unit 12 and the radiation detection panel 14. The radiation is emitted from the radiation-generating unit 12 and transmitted through the object 18 located in the pick-up position. Thus, the radiation carries image information. The radiation is then emitted on the radiation detection panel 14. The controller 16 of the radiation image pick-up system 10 corresponds to the detection signal processor associated with the invention. The radiation detection panel 14 corresponds to an image detection unit of an eighth aspect.

Figure 2:
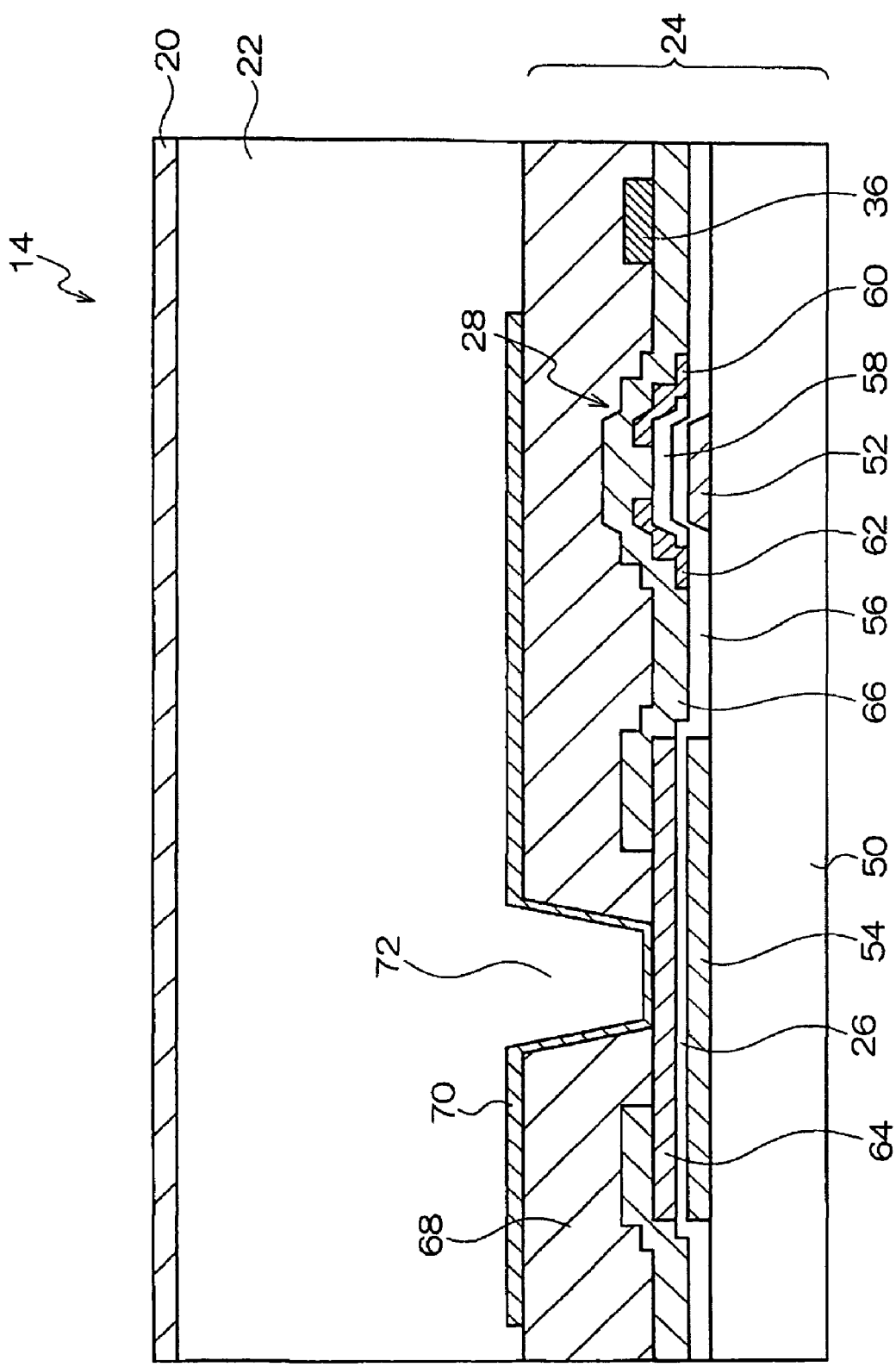
FIG. 2 is a cross-sectional view of a region on which a single pixel of a radiation detection panel is formed.

As shown in FIG. 2, the radiation detection panel 14 is built by stacking a bias electrode 20 connected with a high-voltage power supply, a photoelectric conversion layer 22 for absorbing radiation and changing it into electric charge, and a TFT active-matrix substrate 24 in turn. For example, the photoelectric conversion layer 22 is made of amorphous selenium (a-Se) consisting chiefly of selenium (e.g., Se content in excess of 50%). When radiation is emitted on the photoelectric conversion layer, electric charge (electron-hole pairs) of an amount corresponding to the amount of incident radiation is produced inside the layer. Thus, the emitted radiation is converted into electric charges. In consequence, image information carried by the emitted radiation is converted into electric charge information. The photoelectric conversion layer 22 corresponds to a conversion unit of the eighth aspect.

Figure 3:
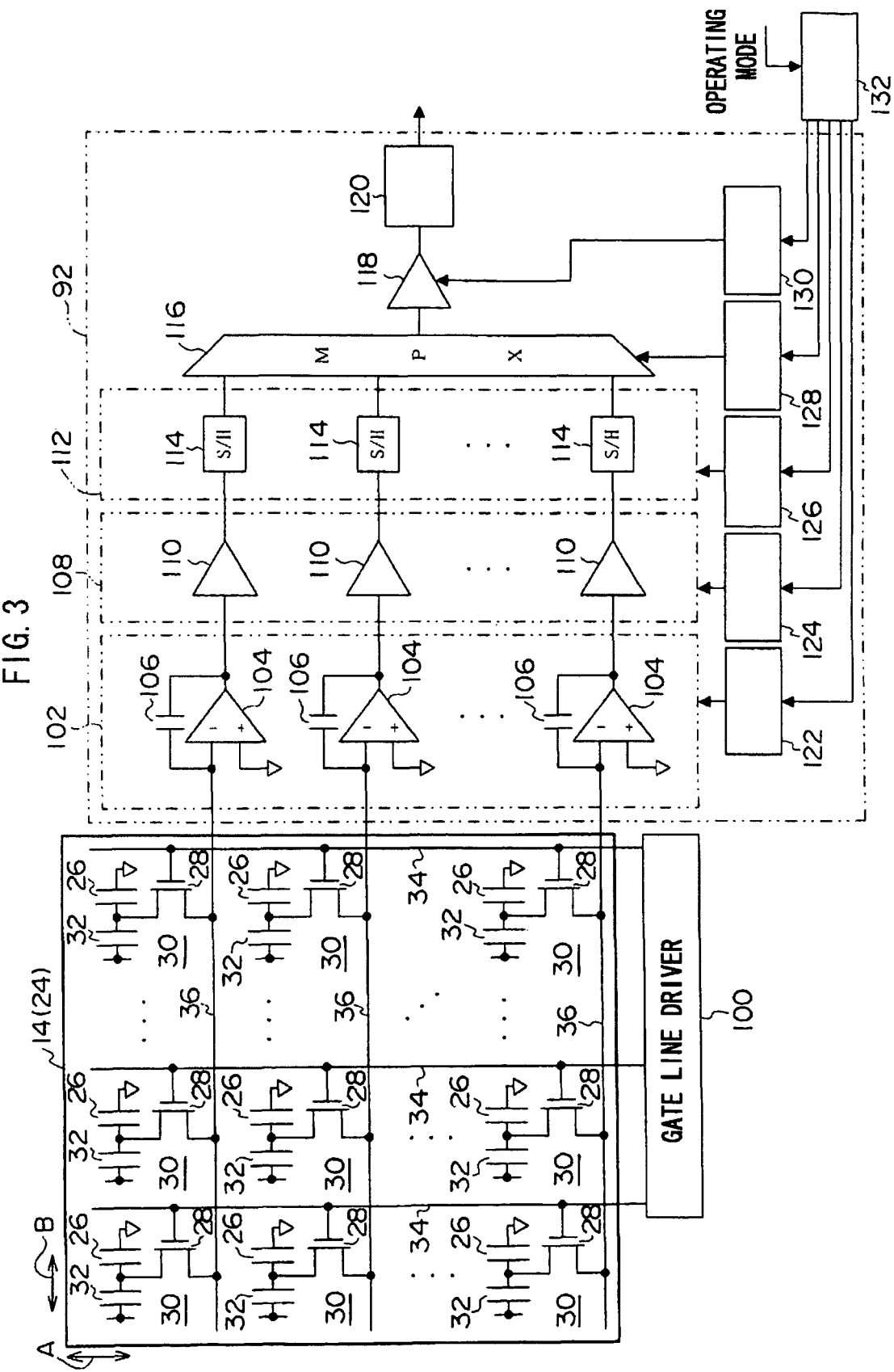
FIG. 3 is a schematic block diagram of the radiation detection panel and its peripheral circuits.

As shown in FIG. 3, a large number of pixels 30 are arranged like a matrix on the TFT active-matrix substrate 24. In FIG. 3, the bias electrode 20 and photoelectric conversion layer 22 corresponding to each individual pixel 30 is schematically shown as a photoelectric converter unit 32. Each pixel 30 has a storage capacitor 26 for storing electric charges generated in the photoelectric conversion layer 22 and a TFT 28 for reading out the charges accumulated in the storage capacitor 26. In addition, plural gate lines 34 extending in the direction of the arrow A in FIG. 3 and plural data lines 36 extending in the direction of the arrow B perpendicular to the direction of the arrow A in FIG. 3 are formed. The gate lines 34 turn on and off the TFTs 28 in the pixels 30. The data lines 36 are used to read out stored charges from the storage capacitors 26 via the activated TFTs 28.

The large number of pixels 30 arranged like a matrix on the TFT active-matrix substrate 24 form plural rows of pixels 30 arrayed in the direction of the arrow A in FIG. 3. The number of the gate lines 34 is equal with the number of rows of pixels 30. The individual gate lines 34 are connected with different rows of the pixels 30. The large number of pixels 30 arranged like a matrix on the TFT active-matrix substrate 24 form plural columns of pixels 30 arrayed in the direction of the arrow B in FIG. 3. The number of the data lines 36 is the same as the number of the columns of the pixels 30 (see also FIGS. 5A and 5B). The data lines 36 are connected with different columns of the pixels 30.

The pixels 30 forming a single row out of the multiple pixels 30 formed on the TFT active-matrix substrate 24 and connected with the same gate line 34 correspond to the plural pixels of the eighth aspect. The storage capacitors 26 correspond to charge-holding units of the eighth aspect.

As shown in FIG. 3, the individual pixels 30 on the TFT active-matrix substrate 24 are formed as a support plate on a glass substrate 50. For example, a non-alkaline glass substrate (e.g., Corning #1737 glass) can be used as the glass substrate 50. Each pixel 30 on the glass substrate 50 has a gate electrode 52, a lower electrode 54 of a storage capacitor, a gate insulator film 56, a semiconductor layer 58, a source electrode 60, a drain electrode 62, an upper electrode 64 of the storage capacitor, an insulator protective film 66, another insulator protective film 68, and a charge collection electrode 70. Of these components, the gate electrode 52, gate insulator film 56, source electrode 60, drain electrode 62, and semiconductor layer 58 together form the aforementioned TFT 28. The lower electrode 54 of the storage capacitor, gate insulator film 56, and upper electrode 64 of the storage capacitor together form the aforementioned storage capacitor 26. The gate lines 34 are formed in the metal layer where the gate electrodes 52 of the TFTs 28 are also formed. The gate electrodes 52 of the TFTs 28 are connected with the gate lines 34. The source electrodes 60 of the TFTs 28 are connected with the data lines 36. The drain electrodes 62 of the TFTs 28 are connected with the upper electrodes 64 of the storage capacitors.

The gate insulator film 56 is made of $SiN_x$, $SiO_x$, or other material and formed so as to cover the gate electrodes 52, gate lines 34, lower electrodes 54 of the storage capacitors, and storage capacitor lines 56. The portions of the gate insulator film 56 that cover the gate electrodes 52 act as the gate insulator film in the TFTs 28. The portions of the gate insulator film 56 that cover the lower electrodes 54 of the storage capacitors act as the dielectric layer in the storage capacitors 26. Accordingly, the regions sandwiched between the storage capacitor lower electrodes 54 and storage capacitor upper electrodes 64 act as the storage capacitors 26. The semiconductor layer 58 acts as the channel regions of the TFTs 28. The source electrodes 60 and drain electrodes 62 are electrically connected via the semiconductor layer 58. The insulator protective film 66 is formed almost over the whole surface of a region corresponding to the single pixel 30 on the glass substrate 50, thus protecting the drain electrodes 62 and source electrodes 60. Additionally, electrical insulation is achieved. Contact holes 72 are formed in the portions of the insulator protective film 66 that are opposite to the lower electrode 54 of the storage capacitor.

The charge collection electrodes 70 are made of an amorphous, transparent conductive oxide film and formed such that the contact holes 72 are filled in. The charge collection electrodes 70 are formed over the source electrodes 60, drain electrodes 62, and upper electrodes 64 of the storage capacitors. The charge collection electrodes 70 and photoelectric conversion layer 22 are electrically connected with each other. Electric charges produced by the photoelectric conversion layer 22 are gathered by the charge collection electrodes 70. The insulator protective film 68 is made of a photosensitive acrylic resin and electrically insulates the TFTs 28 from other portions. The contact holes 72 extend through the insulator protective film 68. The charge collection electrodes 70 are connected with the storage capacitor upper electrodes 64 via the contact holes 72.

The controller of the radiation image pick-up system 10 has a radiation generation control unit 88 connected with the radiation-generating unit 12 and controlling the generation of radiation from the radiation-generating unit 12, a gate line driver unit 90 for activating the gate lines 34, a signal detection unit 92 connected with the individual data lines 36 of the radiation detection panel 14 and performing given signal processing (such as integration, amplification, and A/D conversion) on signal charges (detection signals) outputted from the storage capacitors 26 of the pixels 30 of the radiation detection panel 14 via the data lines 36, a readout control unit 94 connected with the gate line driver unit 90 and with the signal detection unit 92 and controlling the operation of the gate line driver unit 90 and signal detection unit 92 when electric charges are read out from the radiation detection panel 14, and an image processing unit 96 connected with the signal detection unit 92 and performing given image processing (e.g., various corrections such as offset correction and shading correction) on an image indicated by image data that is outputted from the signal detection unit 92 through given signal processing. A display device 98 permitting image data processed by the image processing unit 96 to be displayed as an image is connected with the image processing unit 96. A manual operation unit 99 including a keyboard and permitting the user to specify a mode of operation (image pick-up mode) is connected with the readout control unit 94.

As shown in FIG. 3, the gate line driver unit 90 has a gate line driver 100 connected with the individual gate lines 34 of the radiation detection panel 14. When electric charges are read out from the radiation detection panel 14, the readout control unit 94 gives an instruction to the gate line driver 100 to activate the gate lines 34. When an instruction for activating the gate lines 34 is issued, the gate line driver 100 supplies a high-level voltage signal (ON signal) to each gate line 34. This turns on the TFT 28 of each pixel 30 connected with the gate lines 34 on which the ON signal is supplied. After a lapse of a given period, the supply of the ON signal to the gate lines 34 is stopped. Consequently, the TFT 28 of each pixel 30 connected with the gate lines 34 to which the ON signal is supplied is turned off. In this way, the gate lines are activated in turn.

An integration circuit unit 102, an amplification unit 108, and an S/H unit 112 are arranged in this order inside the signal detection unit 92. The integration circuit unit 102 has as many operational amplifiers 104 as the data lines 36 formed on the TFT active-matrix substrate 24. The data lines 36 of the radiation detection panel 14 are connected with the inverting input terminals of respective different ones of the operational amplifiers 104. The non-inverting input terminals of the operational amplifiers 104 are connected with grounding lines. Respective one ends of the capacitors 106 are connected with the inverting input terminals. The other ends of the capacitors 106 are connected with the output end. Because of the configuration described above, each combination of operational amplifier 104 and capacitor 106 operates as a charge amplifier which integrates the electrical current (signal charge) flowing through the data line 36 connected with the inverting input terminal and which outputs a signal of a level corresponding to the result of the integration.

The amplification unit 108 has the same number of amplifiers 110 as the number of the data lines 36. Each amplifier 110 is made of an operational amplifier. The output terminals of the operational amplifiers 104 of the integration circuit unit 102 are connected with the input terminals of respective different ones of the amplifiers 110 of the amplification unit 108. The amplifiers 110 of the amplification unit 108 amplify and output signals outputted in parallel from the respective charge amplifiers of the integration circuit unit 102. The S/H unit 112 has the same number of sample-and-hold circuits 114 as the number of the data lines 36. The output terminals of the amplifiers 110 of the amplification unit 108 are connected with the input terminals of respective different ones of the sample-and-hold circuits 114 of the S/H unit 112. The output terminals of the sample-and-hold circuits 114 of the S/H unit 112 are connected with input terminals of a multiplexer (MUX) 116. The sample-and-hold circuits 114 hold the levels of the signals outputted in parallel from the amplifiers 110 of the amplification unit 108, and output signals of the held levels to the multiplexer 116 if an instruction is given from the multiplexer 116.

The output terminal of the multiplexer 116 is connected with the input terminal of an amplifier 118. The multiplexer 116 sequentially selects the sample-and-hold circuits 114 of the S/H unit 112 and sends the signal entered from the sample-and-hold circuits 114 to the amplifier 118. As a result, signals entered in parallel into the S/H unit 112 undergo parallel to serial conversion, the signals being equal in number with the data lines 36. The output terminal of the amplifier 118 is connected with the input terminal of an A/D converter (ADC) 120. The amplifier 118 amplifies signals entered sequentially from the multiplexer 116 and outputs the amplified signals to the A/D converter 120. The A/D converter 120 converts the sequentially entered analog signals into digital data and outputs them. The digital data outputted from the A/D converter 120 is input as image data into the aforementioned image processing unit 96.

The signal detection unit 92 has bias current supply units 122-130, which are connected with a bias current control unit 132 forming a part of the readout control unit 94. The bias current supply unit 122 is connected with the operational amplifiers 104 of the integration circuit unit 102 and supplies bias currents of amounts indicated by the bias current control unit 132 to the operational amplifiers 104. The bias current supply unit 124 is connected with the amplifiers 110 of the amplification unit 108 and supplies bias currents of amounts indicated by the bias current control unit 132 to the amplifiers 110. The bias current supply unit 126 is connected with the sample-and-hold circuits 114 of the S/H unit 112 and supplies bias currents of amounts indicated by the bias current control unit 132 to the sample-and-hold circuits 114. The bias current supply unit 128 is connected with the multiplexer 116 and supplies a bias current of a amount indicated by the bias current control unit 132 to the multiplexer 116. The bias current supply unit 130 is connected with the amplifier 118 and supplies a bias current of a amount indicated by the bias current control unit 132 to the amplifier 118.

The bias current supply units 122-130 correspond to the bias current supply components associated with the present invention, while the bias current control unit 132 corresponds to the bias current control component associated with the invention (more specifically, to the bias current control components of second and fourth aspects). The circuits of the signal detection unit 92 excluding the bias current supply units 122-130 correspond to the signal processing unit associated with the invention. More specifically, the integration circuit unit 102, amplification unit 108, and S/H unit 112 correspond to the first circuits associated with the invention. The charge amplifiers of the integration circuit unit 102 correspond to the plural integration circuits described in a fifth aspect. The amplifiers 110 of the amplification unit 108 correspond to plural first amplification circuits of a sixth aspect. The sample-and-hold circuits 114 of the S/H unit 112 correspond to plural holding circuits of the fifth aspect. The multiplexer 116 and amplifier 118 correspond to second circuits associated with the invention. The multiplexer 116 corresponds to a selection circuit of a seventh aspect. The amplifier 118 corresponds to a second amplification circuit of the seventh aspect.

The radiation detection panel 14 and controller 16 are accommodated within the single enclosure that has a flatness shape. In the present embodiment, as shown in FIG. 4B, the radiation detection panel 14 and a printed wiring board 134 on which most of the circuits of the controller 16 are disposed parallel to each other to permit the panel 14 and controller 16 to be accommodated in the same flatness enclosure. The radiation detection panel 14 and printed-wiring board 134 are coupled together via a tape carrier package (TCP) 138 on which an IC chip 136 is mounted. The chip 136 receives some circuits of the signal detection unit 92.

Figure 4A:
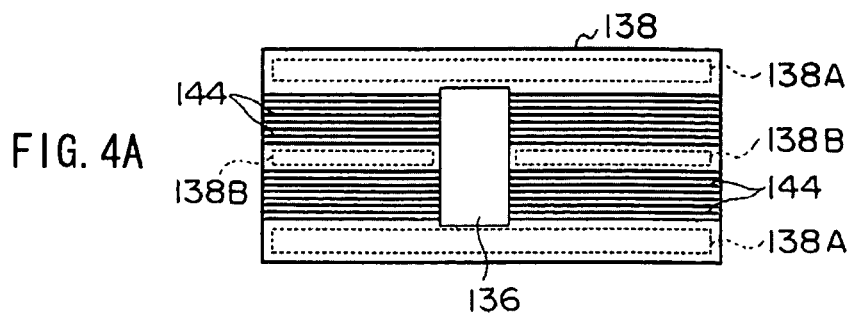
FIG. 4A is a plan view of a TCP (tape carrier package) on which a part of a signal detection unit is mounted.
Figure 4B:
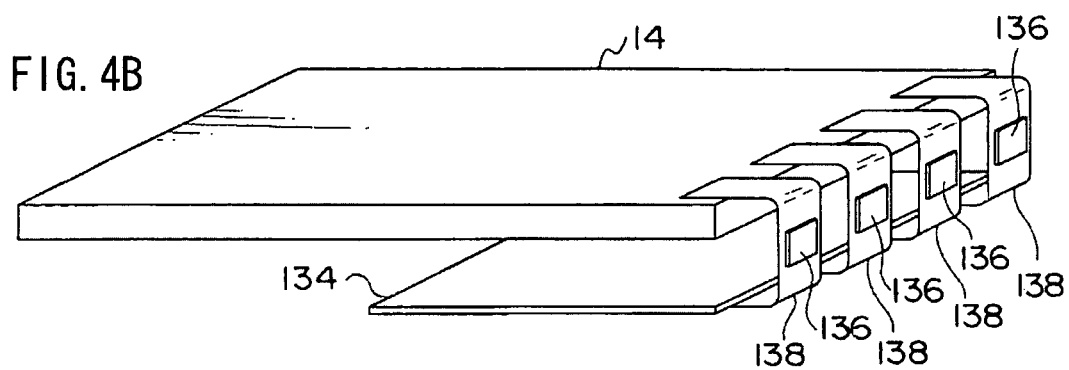
FIG. 4B is a perspective view showing the arrangement of the radiation detection panel, the TCP, and a printed wiring board within an enclosure.

As shown in FIG. 4A, interconnect lines 144 are formed on the TCP 138 and extend longitudinally of it. TCP-holding regions 138A are formed on the opposite ends of the width of the TCP 138 and extend over the whole length in the longitudinal direction of the TCP 138. In each TCP-holding region 138A, neither the IC chip 136 nor the interconnect lines 144 are formed. Furthermore, the interconnect lines 144 are not formed in a widthwise central portion of the TCP 138. This widthwise central portion of the TCP 138 where no interconnect lines are formed are used as a TCP-holding region 138B except for the region where the IC chip 136 is mounted.

Figure 4C:
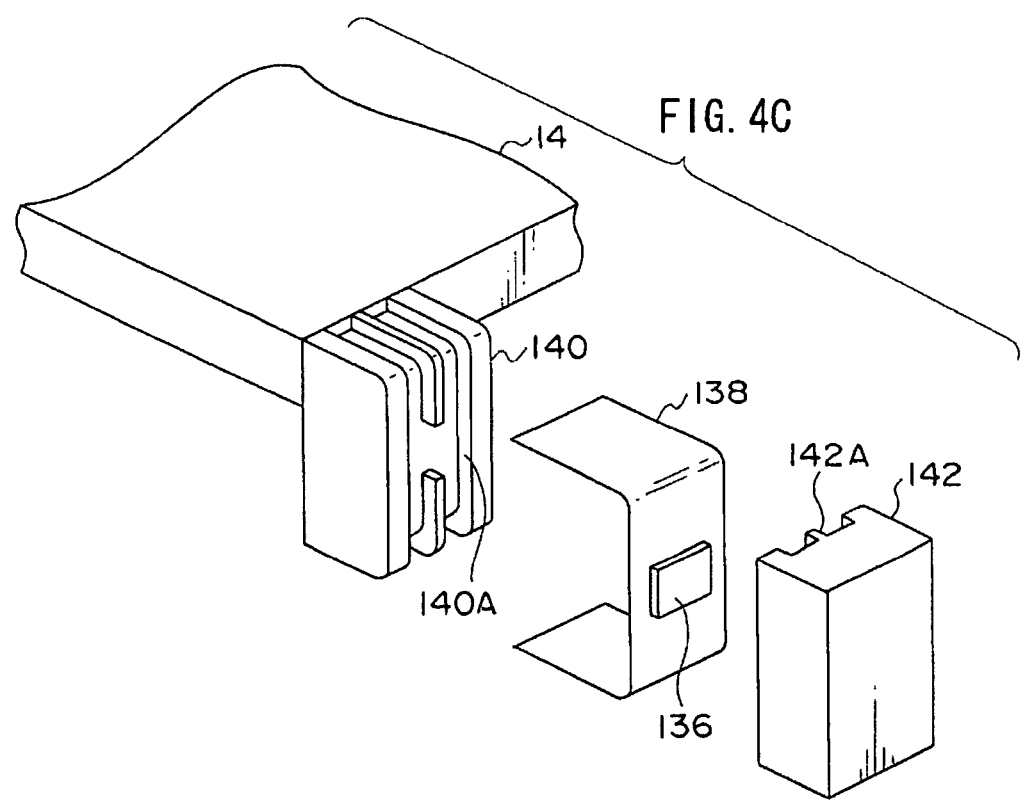
FIG. 4C is a perspective view of a TCP-holding member.

The TCP 138 is held in the position shown in FIG. 4B because it is held between the holding members 140 and 142 while the radiation detection panel 14 and controller 16 are received in the single enclosure. As shown in FIG. 4C, the holding members 140 and 142 have cutouts 140A and 142A, respectively, corresponding to the portions of the TCP 138 that are other than the TCP-holding regions 138A and 138B while the TCP 138 is held between them. Only the TCP-holding regions 138A and 138B of the TCP 138 make contact with the holding members 140 and 142 and become held therebetween. Consequently, the TCP is held in the position shown in FIG. 4B.

The operation of the readout control unit 94 and signal detection unit 92 is next described as the operation of the present embodiment when stored charges are read out from the storage capacitors 26 of the individual pixels 30 under the condition where the object 18 has been radiologically imaged and an amount of electric charge according to the object 18 is being accumulated in the storage capacitors 26 of the pixel units 30 of the radiation detection panel 14 by the radiological image pick-up.

Plural modes of operation (image pick-up modes) have been set into the radiation image pick-up system 10 associated with the present embodiment. Examples of the modes include a standard mode in which about 3 frames of image are outputted per second (output rate), a high-speed mode in which about 10 frames of image are outputted per second (output rate), and a low-noise mode in which about 1 frame of image is outputted per second (output rate). Images that are outputted in the standard mode can be displayed as a semi-motion picture sequence on the display device 98. Images that are outputted in the high-speed mode are adapted to be displayed as a motion picture sequence. Images that are outputted in the low-noise mode are adapted to be displayed as still images. More modes of operation (image pick-up modes) may also be provided.

In the radiation image pick-up system 10 associated with the present embodiment, various parameters including the amount of radiation emitted from the radiation-generating unit 12, the number of gate lines 34 to which an ON signal is supplied simultaneously from the gate line driver 100, and the interval at which stored charges are read out from the radiation detection panel 14 are set for the individual modes of operation (image pick-up modes). Where stored charges are read from the storage capacitors 26 of the pixels 30 of the radiation detection panel 14, the readout control unit 94 acquires the current mode of operation (imaging mode) set by the user via the manual control unit 99 prior to the readout of the stored charges, and switches the values of the parameters according to the acquired current mode of operation.

Figure 5A:
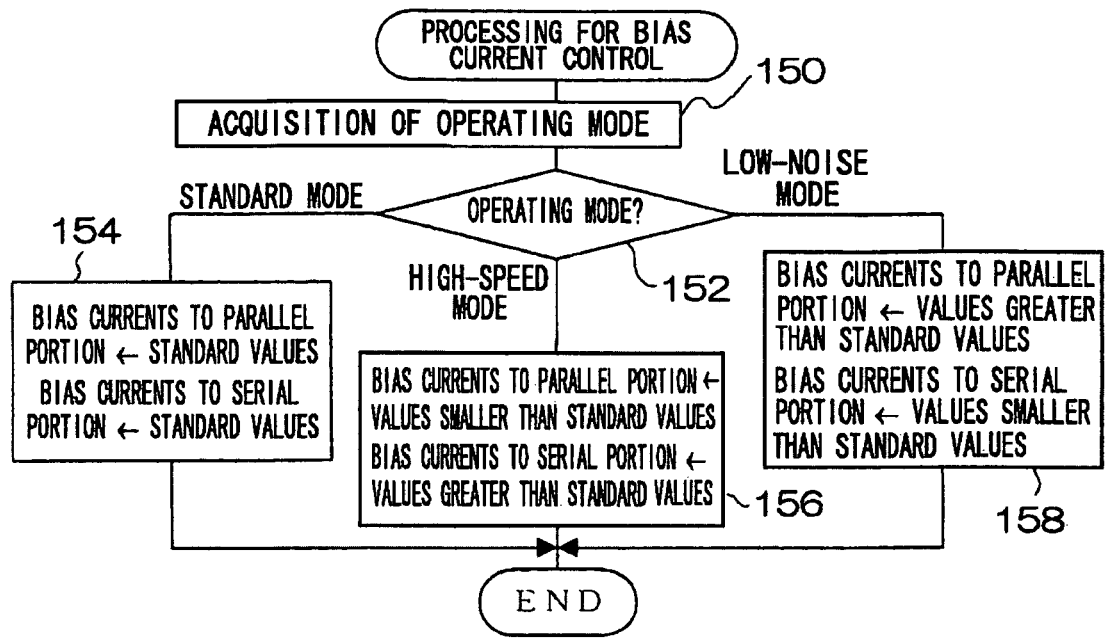
FIG. 5A is a flowchart illustrating the contents of processing for controlling bias currents.
Figure 5B:
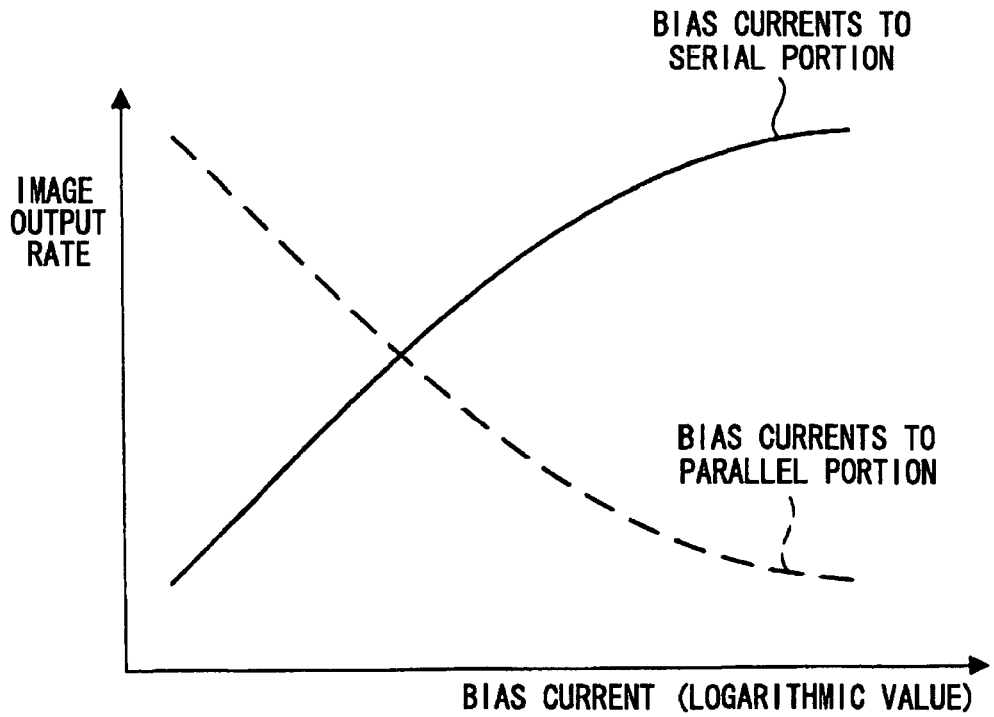
FIG. 5B is a graph illustrating other contents of the processing for controlling the bias currents.

The readout control unit 94 associated with the present embodiment also performs processing (subroutine) for controlling the bias currents shown in FIGS. 5A and 5B by means of the bias current control unit 132 (see FIG. 3). In this processing for control of the bias currents, the current mode of operation (image pick-up mode) of the radiation image pick-up system 10 is first acquired in step 150. In the next step 152, a decision is made as to what mode of operation was acquired in step 150. A branch is made according to the result of the decision.

Where the mode of operation acquired in step 150 is the standard mode, program control goes from step 152 to step 154, where processing (subroutine) for parallel to serial conversion is performed. That is, the signal detection unit 92 has a parallel portion by which signals outputted from the data lines 36 are processed in parallel. In the present embodiment, the parallel portion includes the integration circuit unit 102, amplification unit 108, and S/H unit 112. Bias currents supplied to the parallel portion are set to standard values. The signal detection unit 92 also has a serial portion for converting signals input from the parallel portion into serial form and processing the serial signals obtained by the conversion. In the present embodiment, the serial portion includes the multiplexer 116 and amplifier 118. Bias currents supplied to the serial portion are set to standard values. The bias current supply units 122-130 are controlled such that the bias currents of the set amounts are supplied to the circuits of the parallel and serial portions of the signal detection unit 92.

Where the mode of operation acquired in step 150 is the high-speed mode, program control goes from step 152 to step 156, where the bias currents supplied to the parallel portion of the signal detection unit 92 are set to first given values smaller than the standard values. The bias currents supplied to the serial portion are set to second given values greater than the standard values. The bias current supply units 122-130 are controlled so that the bias currents of the set amounts are supplied to the circuits of the parallel and serial portions of the signal detection unit 92.

When the mode of operation acquired in step 150 is the low-noise mode, program control proceeds from step 152 to step 158. The bias currents supplied to the parallel portion of the signal detection unit 92 are set to third given values greater than the standard values. The bias currents fed to the serial portion are set to fourth given values smaller than the standard values. The bias current supply units 122-130 are controlled in such a way that the bias currents of the set amounts are furnished to the circuits of the parallel and serial portions of the signal detection unit 92.

The amounts of the bias currents supplied to the parallel and serial portions of the signal detection unit 92 are set and controlled as described previously. The readout control unit 94 operates the circuits of the signal detection unit 92 according to the current mode of operation as follows to read out stored charges from the storage capacitors 26 of the pixels 30 of the radiation detection panel 14.

Figure 6:
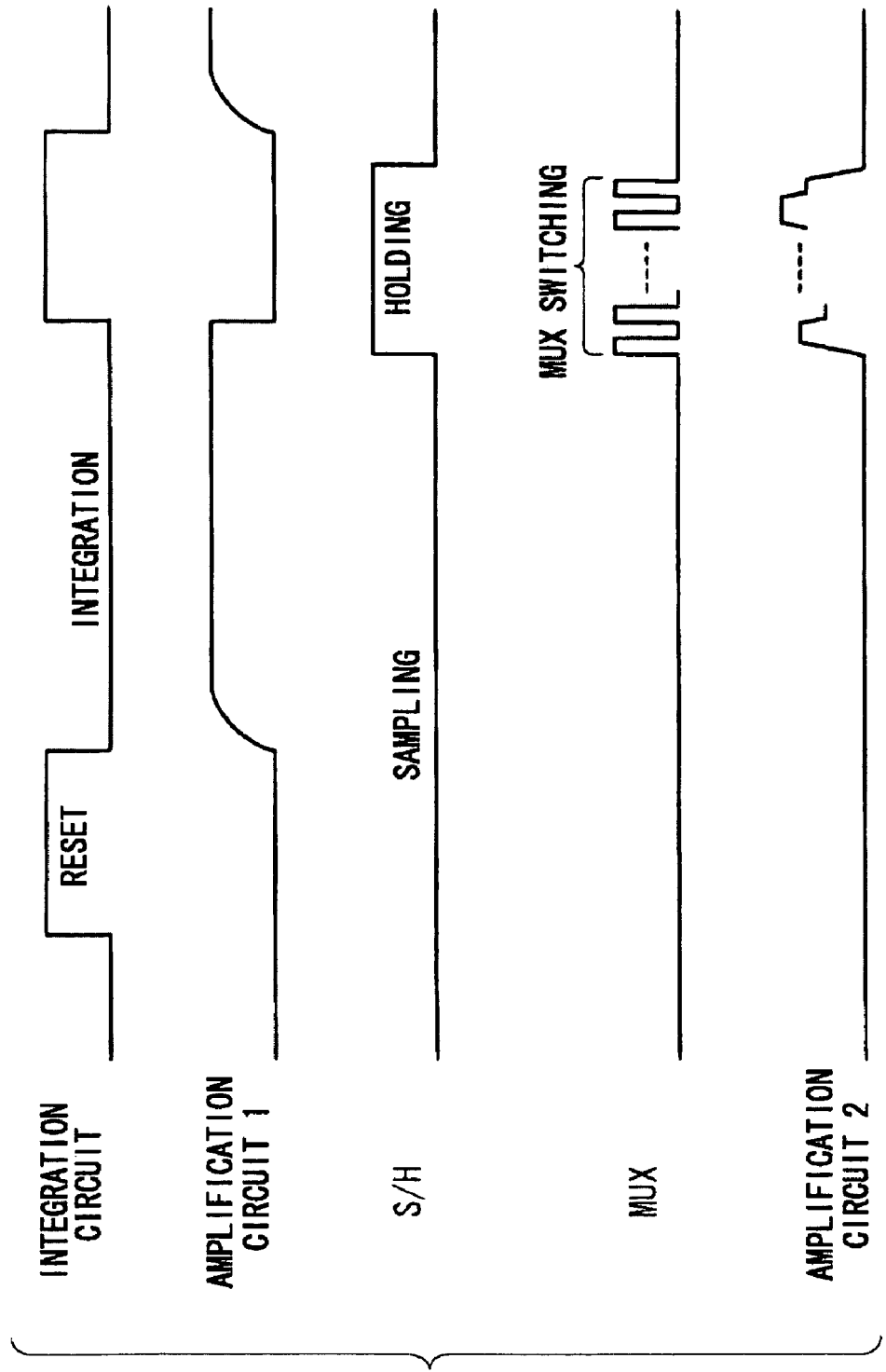
FIG. 6 is a timing chart illustrating the operation of a signal detection unit.

Switches are connected in parallel with the capacitors 106 of the integration circuit unit 102. The readout control unit 94 turns on the switches for given periods (intervals during which stored charges are read out) corresponding to the current mode of operation. Electric charges accumulated in the capacitors 106 of the charge amplifiers of the integration circuit unit 102 are released (i.e., the capacitors are discharged) at given intervals as shown in the portion "INTEGRATION CIRCUIT" of FIG. 6. The intervals during which the switches are kept on are indicated by "RESET" in the signal waveform "INTEGRATION CIRCUIT" of FIG. 6. The charge amplifiers of the integration circuit unit 102 integrate signal charges flowing through the data lines 36 during the periods "INTEGRATION" of the waveform.

When the reset period of each charge amplifier of the integration circuit unit 102 ends and the switches are turned off, the readout control unit 94 causes the gate line driver 100 to supply an ON signal to some of the gate lines 34, the number of which corresponds to the current mode of operation. The TFTs 28 at the pixels 30 connected with the gate lines 34 to which the ON signal is supplied are turned on. Electric charges accumulated in the storage capacitors 26 of the pixels 30 flow as signal charges through the corresponding data lines 36. As a result, electric charges are accumulated in the capacitors 106 of the charge amplifiers of the integration circuit unit 102. Thus, integration is performed. The output signals from the charge amplifiers of the integration circuit unit 102 are amplified by the amplifiers 110 of the amplification unit 108 and fed into the sample-and-hold circuits 114 of the S/H unit 112. The output signal waveform from each amplifier 110 is denoted by "AMPLIFIER CIRCUIT 1" in FIG. 6.

When a period of time corresponding to the current mode of operation has elapsed since the start of supply of the ON signal to the gate lines 34, the readout control unit 94 causes the gate line driver 100 to stop the supply of the ON signal to the gate lines 34. This turns off the TFTs 28 of the pixels 30 connected with the gate lines 34 to which the ON signal has been supplied. When a given time longer than the time required for each signal charge transmitted through each data line 36 becomes null has elapsed since the stop of the supply of the ON signal to the gate lines 34, the readout control unit 94 causes the sample-and-hold circuits 114 of the S/H unit 112 to sample the input signal and hold it for a given period of time (see also signal waveform "S/H" of FIG. 6). The readout control unit 94 causes the multiplexer 116 to sequentially select and output the signals at intervals corresponding to the current mode of operation, the signals being held in the sample-and-hold circuits 114 after sampled (see also signal waveform "MUX" of FIG. 6, especially during period "MUX SWITCHING").

Plural signals are outputted in parallel from the charge amplifiers of the integration circuit unit 102, amplified by the amplifiers 110 of the amplification unit 108, and applied in parallel to the sample-and-hold circuits 114 of the S/H unit 112. The signals are once sampled by the sample-and-hold circuits 114 and then sequentially outputted to the multiplexer 116 at intervals corresponding to the current mode of operation. Thus, parallel to serial conversion is made. The serial signals that are sequentially outputted from the multiplexer 116 at intervals corresponding to the current mode of operation are amplified by the amplifiers 118 and converted into digital data by the A/D converter 120. The data are outputted to the image processing unit 96 at an image output rate corresponding to the current mode of operation.

When stored charges are read from the storage capacitors 26 of the pixels 30 of the radiation detection panel 14 as described above, the circuits of the parallel and serial portions of the signal detection unit 92 are controlled by the readout control unit 94 such that the circuits operate at rates corresponding to the current mode of operation. In the present embodiment, if the mode of operation is the high-speed mode as mentioned previously, the bias currents supplied to the serial portions are increased as compared with in the standard mode. The bias currents supplied to the parallel portion are reduced as compared with in the standard mode. Consequently, in the high-speed mode where image signals (image data) should be outputted at high rates, the serial portion (second circuits associated with the present invention) of the signal detection unit 92 whose status of operation directly affects the output rate of image signal (image data) can be operated in a mode more adapted for high-speed outputting. On the other hand, the amount of heat generated by the parallel portion (first circuits associated with the invention) whose status of operation hardly affects the output rate of image signal (image data) is suppressed. Consequently, the inside of the enclosure in which the radiation detection panel 14 and controller 16 are received is prevented from becoming hot; otherwise, the radiation detection panel 14 would be damaged.

Also, in the present embodiment, if the mode of operation is the low-noise mode as described above, the bias currents supplied to the parallel portion are increased as compared with in the standard mode, while the bias currents supplied to the serial portion are reduced as compared with in the standard mode. Consequently, in the low-noise mode where higher-quality image signals (image data) should be outputted, the parallel portion (first circuits associated with the present invention) of the signal detection unit 92 which significantly affects the noise levels of the image signals (image data) can be operated in a mode advantageous for reduction in noise level. On the other hand, the amount of heat generated by the serial portion (second circuits associated with the invention) that less affects the noise levels of the image signals (image data) is suppressed. In consequence, the inside of the enclosure where the radiation detection panel 14 and controller 16 are accommodated can be prevented from getting hot; otherwise, the radiation detection panel 14 would be damaged.

In the above-described embodiment, the bias currents supplied to the parallel and serial portions of the signal detection unit 92 are switched according to the mode operation (image pick-up mode). The invention is not limited to this embodiment. In a case where a mode in which a parameter such as an image signal (image data) output rate is directly set is used instead of the mode of operation (imaging mode), the bias currents supplied to the parallel and serial portions may be varied continuously according to the value of the parameter. As an example, where the rate at which image signal (image data) is outputted is specified, the bias currents supplied to the serial portion are increased with increasing the image output rate, for example, as shown in FIG. 5B. Meanwhile, the bias currents supplied to the parallel portion are reduced. As the image output rate is reduced, the bias currents supplied to the parallel portion are increased, whereas the bias currents supplied to the serial portion are reduced. Consequently, as the image output rate increases, the serial portion is operated in a mode more adapted for high-speed outputting. As the image output rate decreases (i.e., more stringent requirements are imposed on the noise level of image signal (image data)), the parallel portion is operated in a mode more advantageous for reduction in noise level. This can be accomplished while suppressing the amount of heat generated by the whole signal detection unit 92. The embodiment described so far corresponds to a third aspect.

Figure 7:
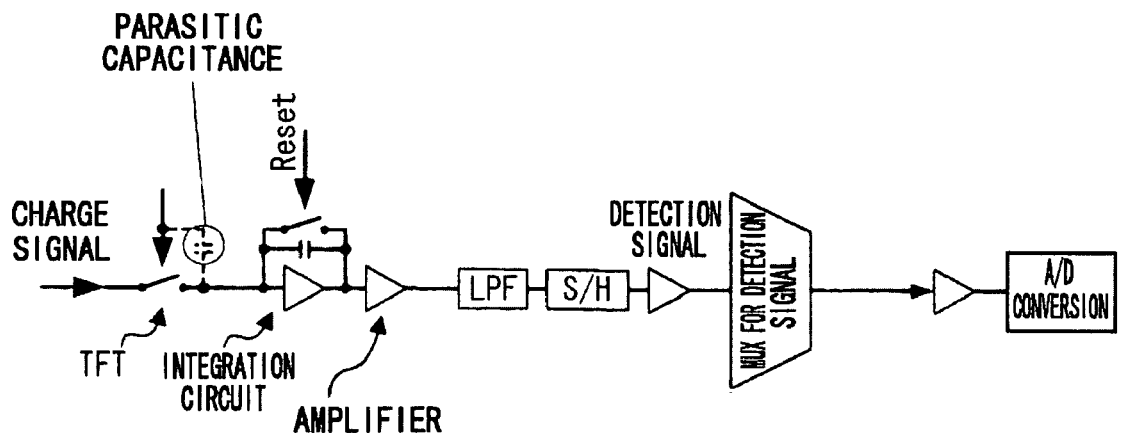
FIG. 7 is a schematic block diagram showing other configuration of the signal detection unit.
Figure 8:
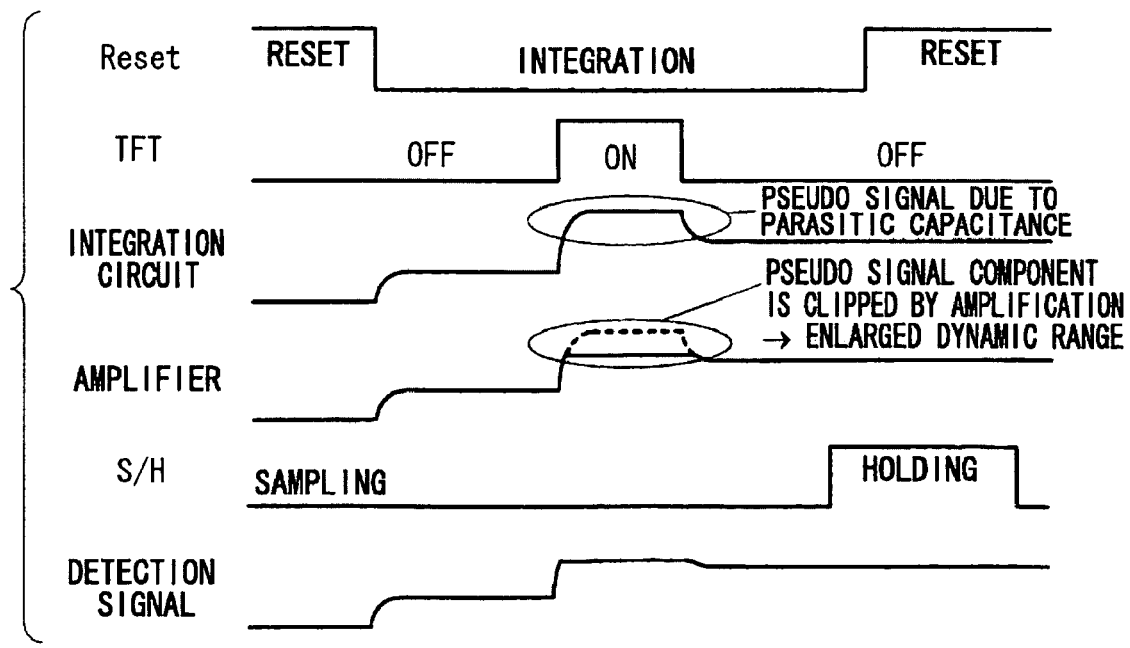
FIG. 8 is a timing chart illustrating the operation of the signal detection unit of FIG. 7.

Generally, parasitic capacitors are present at the intersections of the gate lines 34 and data lines 36 on the TFT active-matrix substrate 24 as shown also in FIG. 7. When the TFTs 28 are turned on and off, the voltage developed across each parasitic capacitor varies, producing a feedthrough signal that is a pseudo signal. The pseudo signal is superimposed on the signal charges flowing through the data lines 36 after the stored charges are outputted from the storage capacitors 26 of the pixels 30. Consequently, there arises the problem that the pseudo signal is added as a noise component to the output signal from the integration circuit as indicated by "PSEUDO SIGNAL DUE TO PARASITIC CAPACITANCE" in FIG. 8.

In contrast, in the configuration shown in FIG. 7, the amplification factor of the amplifier connected with the output side of the integration circuit is set so that, when the pseudo signal produced by parasitic capacitance is added as a noise component to the output signal from the integration circuit, the noise component (pseudo signal) is clipped (saturated) by amplification. Thereby, the noise component is removed from the output signal from the amplifier (see also the output signal from the amplifier indicated by "PSEUDO SIGNAL COMPONENT IS CLIPPED BY AMPLIFICATION" in FIG. 8). Consequently, the pseudo signal produced by parasitic capacitance can be removed from the output signal as indicated by "DETECTION SIGNAL" in FIG. 8.

In the above description, the photoelectric conversion layer 22 for directly converting emitted radiation into electric charges is explained as the conversion unit of an eighth aspect. The invention is not limited to this. The conversion unit may be so designed that it once converts emitted radiation into electromagnetic waves (e.g., visible light) and then converts the obtained electromagnetic waves into electric charges (i.e., indirect conversion). In addition, in the above description, the photoelectric conversion layer 22 is formed on the TFT active-matrix substrate 24. The conversion unit may be a hardware unit separate from the substrate on which plural pixels are arranged, each pixel having a storage capacitor and a switching component.

Further, in the above description, the radiation detection panel 14 is designed so that the multiple pixels 30 including TFTs 28 and storage capacitors 26 are arranged like a matrix (i.e., in two dimensions). The invention is not limited to this example. The radiation detection panel may be designed so that it has plural pixels arranged in a row (in one dimension).

Additionally, in the above description, X-ray is described as one example of the radiation converted into electric charges by the photoelectric conversion layer acting as the conversion unit of the eighth aspect. The invention is not limited to this. An electron beam or other kind of radiation such as α radiation (alpha rays) may also be used as long as the beam or radiation is absorbed into the conversion unit, converted into electric charges, and accumulated in the storage capacitors. The radiation may also be visible light, ultraviolet radiation, infrared radiation, and other electromagnetic waves in an arbitrary wavelength range.

A first aspect of the invention provides a detection signal processor having a signal processing unit, bias current supply components for supplying bias currents to circuits forming the signal processing unit, and a bias current control component for switching the amount of each individual one of bias currents supplied to the circuits forming the signal processing unit by the bias current supply components. The circuits include first circuits and second circuits. The signal processing unit performs first signal processing in parallel on plural detection signals entered in parallel. The signal processing unit then performs processing for parallel to serial conversion on the detection signals undergone the first signal processing to convert the detection signals into serial detection signals. The signal processing unit then performs second signal processing on the serial detection signals obtained by the conversion. The bias currents include first bias currents supplied to the first circuits performing the first signal processing and second bias currents supplied to the second circuits performing the processing for the parallel to serial conversion and the second signal processing in turn.

The detection signal processor of the first aspect has the signal processing unit that performs first signal processing in parallel on plural detection signals entered into the signal processing unit in parallel, performs processing for parallel to serial conversion on the detection signals undergone the first signal processing to thereby convert the signals into serial detection signals, and then performs second signal processing of the serial detection signals obtained by the conversion. The bias current supply components supply bias currents to the circuits forming the signal processing unit.

Generally, the processing for parallel to serial conversion is performed by once holding plural signals entered in parallel and then sequentially outputting the held signals. Therefore, where the processing for parallel to serial conversion is performed during signal processing as described above, the operating speeds of the circuits for performing the processing for parallel to serial conversion and following stage of processing directly affect the rate at which a detection signal (detected data) is outputted. On the other hand, the operating speeds of the circuits performing processing prior to the processing for parallel to serial conversion hardly affect the rate at which the detection signal (detected data) is outputted. Generally, the degree of the adverse effect of the noise component added to the signal on the S/N of the output signal increases as the position where the noise component is added to the signal goes upstream along the signal transmission path (circuits).

As described above, based on the fact that the circuits directly affecting the rate at which the detection signal (detection) is outputted are different from the circuits greatly affecting the S/N of the output detection signal (detected data) adversely, the bias current control component is provided in the first aspect. The bias current control component switches the amount of each individual one of the bias currents supplied by the bias current supply components to the circuits forming the signal processing unit. The bias currents include first bias currents supplied to the first circuits included in the circuits forming the signal processing unit, the first circuits performing first signal processing. Furthermore, the bias currents include second bias currents supplied to the second circuits included in the circuits forming the signal processing unit. The second circuits perform processing for parallel to serial conversion and second signal processing in turn.

Consequently, where high-speed outputting of the detection signal (detected data) is required, only the second bias currents are increased to operate only the second circuits at high speeds. Thus, the detection signal (detected data) can be outputted at high speed while suppressing the amount of generated heat. Where a lower level of noise is required, only the first bias currents are increased to operate only the first circuits with low noise. Hence, low-noise operation is enabled while suppressing the amount of generated heat. Accordingly, according to the first aspect, operation with high-speed outputting is enabled while suppressing the amount of generated heat. Also, low-noise operation is enabled.

A second aspect is the detection signal processor of the first aspect. The bias current control component reduces the second bias currents, for example, in a case where the first bias currents are increased. The first bias currents are reduced in a case where the second bias currents are increased. Consequently, whether any one type of the first and second bias currents is increased, bias currents of the other type are reduced. Increase in the amount of heat generated by the whole signal processing unit can be suppressed. If a member of low heatproofness is present near the signal processing unit, damage to the member can be prevented.

A third aspect is the detection signal processor of the second aspect. Where the second circuits are designed to perform processing for parallel to serial conversion and second signal processing according to a speed corresponding to a set value of the output speed of the serial detection signal, the bias current control component increases the second bias currents and reduces the first bias currents, for example, with increasing the set value of the output speed. As the set value of the output speed decreases, the first bias currents are increased but the second bias currents are reduced. Consequently, as the set value of the output speed of the serial detection signal is increased, the second circuits are operated in a mode more adapted for high-speed outputting. As the set value of the output speed of the serial detection signal decreases, the first circuits can be operated in a mode more advantageous for lower noise level while suppressing the amount of heat generated by the whole signal processing unit.

A fourth aspect is the detection signal processor of the second aspect. Where at least a standard mode, a high-speed mode, and a low-noise mode are established as selectable modes of operation, the bias current control component increases the second bias currents and reduces the first bias currents as compared with in the standard mode, for example, in a case where the high-speed mode is selected as the mode of operation. Where the low-noise mode is selected as the mode of operation, the bias current control component increases the first bias currents and reduces the second bias currents as compared with in the standard mode. Consequently, where the high-speed mode is selected, the second circuits can be operated in a mode more adapted for high-speed outputting. Where the low-noise mode is selected, the first circuits can be operated in a mode more advantageous for lower level of noise than in the standard mode. These can be accomplished while suppressing the amount of heat generated by the whole signal processing unit. In the fourth aspect, selectable modes of operation are not limited to three. More modes of operation may be established.

The fifth aspect is the detection signal processor of the first aspect. The first circuits have plural integration circuits for integrating plural detection signals, for example, input in parallel over a given period and plural holding circuits for holding levels of the detection signals input in parallel. The sixth aspect is the detection signal processor of the fifth aspect. The first circuits further include plural first amplification circuits for amplifying plural detection signals outputted in parallel, for example.

The seventh aspect is the detection signal processor of the first aspect. The second circuits have, for example, a selection circuit for sequentially outputting the levels held in the plural holding circuits operating to hold levels of plural detection signals input in parallel and a second amplification circuit for amplifying the detection signals sequentially outputted from the selection circuit.

The eighth aspect is the detection signal processor of any one of the first through fourth aspects. For example, the signal processing unit includes an image detection unit that has a conversion unit for converting emitted radiation or electromagnetic waves into electric charges and plural pixels having charge-holding units for holding the electric charges obtained by the conversion unit as signal charges. Plural signal charges read from the charge-holding units of the pixels of the image detection unit are entered as the plural detection signals in parallel.

A ninth aspect is the detection signal processor of the eighth aspect. For example, at least the signal processing unit is accommodated in the same enclosure together with the image detection unit. In the ninth aspect, the bias current supply components and bias current control component may also be accommodated in the same enclosure.

As described so far, in the invention, the signal processing unit performs first signal processing in parallel on plural detection signals input in parallel, performs processing for parallel to serial conversion on the detection signals undergone the first signal processing to convert the detection signals into serial detection signals, and performs second signal processing on the serial detection signals obtained by the conversion in turn. The amount of each individual one of bias currents supplied to the circuits of the signal processing unit is switched. The bias currents include first bias currents supplied to first circuits for performing the first signal processing. Furthermore, the bias currents include second bias currents supplied to second circuits for performing the processing for parallel to serial conversion and the second signal processing in turn. Consequently, there is a great advantage that operation with high-speed outputting and operation with low noise are enabled while suppressing the amount of generated heat.

What is claimed is:

1. A detection signal processor comprising:
a signal processing unit that applies a first signal processing in parallel to plural detection signals input in parallel, converts the plural detection signals that have undergone the first signal processing to serial detection signals by applying a parallel-to-serial conversion processing to the plural detection signals, and applies a second signal processing to the converted serial detection signals in turn;
bias current supply components that supply bias currents to each circuit configuring the signal processing unit, the circuits including first circuits and second circuits; and
a bias current control component that switches amount of the bias currents supplied to the each circuit configuring the signal processing unit by the bias current supply components, the bias currents including first bias currents supplied to the first circuits carrying out the first signal processing and second bias currents supplied to the second circuits carrying out the parallel-to-serial conversion processing and the second signal processing in turn.

2. The detection signal processor of claim 1, wherein the bias current control component reduces the second bias currents in cases where the first bias currents are increased and reduces the first bias currents in cases where the second bias currents are increased.

3. The detection signal processor of claim 2,
wherein the second circuits carry out the parallel-to-serial conversion processing and the second signal processing at rates corresponding to a set value of a rate at which the serial detection signals are outputted,
wherein the bias current control component increases the second bias currents and reduces the first bias currents in accordance with increasing of the set value of the rate at which the serial detection signals are outputted, and
wherein the bias current control component increases the first bias currents and reduces the second bias currents in accordance with reduction of the set value of the rate at which the serial detection signals are outputted.

4. The detection signal processor of claim 2,
wherein at least a standard mode, a high-speed mode, and a low-noise mode are provided as selectable modes of operation,
wherein when the high-speed mode is selected as a mode of operation, the bias current control component increases the second bias currents and reduces the first bias currents as compared with the standard mode, and
wherein when the low-noise mode is selected as a mode of operation, the bias current control component increases the first bias currents and reduces the second bias currents as compared with the standard mode.

5. The detection signal processor of claim 1, wherein the first circuits include plural integration circuits that integrate the plural detection signals input in parallel over a given period of time and plural holding circuits that hold levels of the plural detection signals input in parallel.

6. The detection signal processor of claim 5, wherein the first circuits further include plural first amplification circuits that amplify the plural detection signals input in parallel.

7. The detection signal processor of claim 1, wherein the second circuits include a selection circuit that sequentially outputs the levels as detection signals, the levels being held in the holding circuits that hold the levels of the plural detection signals input in parallel, and a second amplification circuit that amplifies the detection signals sequentially outputted from the selection circuit.

8. The detection signal processor of claim 1, wherein
an image detection unit that includes a conversion unit that converts emitted radiation or electromagnetic waves into electric charges and a plural pixel units that respectively include charge-holding units that hold the converted electric charges as signal charges, and
plural signal charges are input into the signal processing unit as the plural detection signals in parallel, the plural signal charges being respectively read from the charge-holding units of the plural pixel units.

9. The detection signal processor of claim 8, wherein at least the signal processing unit is accommodated within an enclosure together with the image detection unit.

10. The detection signal processor of claim 9, wherein the bias current supply components and the bias current control component are also accommodated in the enclosure together with the image detection unit.

* * * * *